No. 660,872. Patented Oct. 30, 1900.
P. B. TAYLOR.
PRESSURE REGULATING OR REDUCING VALVE.
(Application filed Aug. 21, 1899.)
(No Model.) 4 Sheets—Sheet 1.

WITNESSES:

INVENTOR:
PERCY B. TAYLOR,
BY
ATTORNEY

THE NORRIS PETERS CO., PHOTO-LITHO., WASHINGTON, D. C.

No. 660,872. Patented Oct. 30, 1900.
P. B. TAYLOR.
PRESSURE REGULATING OR REDUCING VALVE.
(Application filed Aug. 21, 1899.)
(No Model.) 4 Sheets—Sheet 2.

WITNESSES:

INVENTOR:
PERCY B. TAYLOR,
BY
ATTORNEY

No. 660,872. Patented Oct. 30, 1900.
P. B. TAYLOR.
PRESSURE REGULATING OR REDUCING VALVE.
(Application filed Aug. 21, 1899.)
(No Model.) 4 Sheets—Sheet 3.

WITNESSES:

INVENTOR:
PERCY B. TAYLOR,
BY
ATTORNEY

No. 660,872. Patented Oct. 30, 1900.
P. B. TAYLOR.
PRESSURE REGULATING OR REDUCING VALVE.
(Application filed Aug. 21, 1899.)
(No Model.) 4 Sheets—Sheet 4.

WITNESSES:

INVENTOR:
PERCY B. TAYLOR,
BY
ATTORNEY

THE NORRIS PETERS CO., PHOTO-LITHO., WASHINGTON, D. C.

UNITED STATES PATENT OFFICE.

PERCY B. TAYLOR, OF NEWARK, NEW JERSEY.

PRESSURE REGULATING OR REDUCING VALVE.

SPECIFICATION forming part of Letters Patent No. 660,872, dated October 30, 1900.

Application filed August 21, 1899. Serial No. 727,878. (No model.)

*To all whom it may concern:*

Be it known that I, PERCY B. TAYLOR, a citizen of the United States, residing at Newark, in the county of Essex and State of New Jersey, have invented certain new and useful Improvements in Pressure Regulating or Reducing Valves; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to that class of valves known as "pressure regulating or reducing" valves; and my invention has for its primary object to provide a balanced valve construction the function of which is to deliver a uniform low pressure while receiving a variable and higher pressure, said construction being effective in its operation, as well as strong, durable, and positive in its results, to deliver from said valve at a pressure not higher than the initial pressure of the gas or fluid passed into the valve.

A further object of this invention is to provide, in connection with a balanced valve, a controlling mechanism or device, coöperating with the valve, to maintain a delivery-pressure of the gas or liquid which shall not be higher than the initial pressure, the several parts acting automatically to maintain such pressure while the valve is in use.

The controlling of the herein-described valve can be accomplished in three different ways: first, by means of the liquid or gas flowing through the valve, as in the case of furnishing steam from a boiler, and the liquid or gas itself controlling and operating the valve-regulating mechanism; secondly, by means of a different liquid or gas, as in the case of a pump-governor, in which case the material being pumped is employed as the medium for operating the regulating mechanism of the valve in its delivery of steam or the like to drive the pump, and, thirdly, by means of an outside connection, (either electrical or mechanical,) as is used in drying-room or heating and ventilating devices, in which case the mechanical or electrical means, as a thermostat actuated by the change of temperature, operates the valve-regulating mechanism mechanically and delivers steam at a greater or less pressure to the heating or drying apparatus, as may be needed.

My invention therefore consists in the general construction of valve herein set forth, embodying a novel regulating means for controlling the valve, the features of which may be applied to any and all of the purposes above set forth.

Furthermore, my invention consists in the employment of an adjustable and movable fulcrum in any desirable form, its operating lever or levers in any position, or any part of a system of levers, and means for moving said fulcrum in such a manner as to vary the opening and closing of the valve for any purpose, either for steam, air, water, or any liquid or gas, and in connection with either diaphragm pistons or other pressure areas that may be used in the various constructions, and the system of actuating or controlling levers work in pin-fulcrums or knife-edges or other suitable means that may assist in the perfect operation of the valve or valves to which my invention is applied.

My invention consists, further, in the several novel arrangements and combinations of parts, as well as in the details of the construction thereof, all of which will be hereinafter described in detail, and finally embodied in the clauses of the claim.

The invention is clearly illustrated in the accompanying sheets of drawings, in which—

Fig. 3 is a vertical transverse section, Figs. 9 and 10 are a side view and bottom view, respectively, of the diaphragm-lever. Figs. 11 and 12 are an end view and cross-section, respectively, of a connecting-link; and Figs. 13 and 14 are a side elevation and bottom view, respectively, of the spindle-lever. Fig. 15 is a cross-section, and Fig. 16 a plan, of a guide-plate employed in the valve construction. Fig. 17 is a sectional view of the upper part of a valve equipped with a piston for actuating the valve-regulating mechanism. Fig. 18 is a similar view illustrating an arrangement of valve with a piston and actuating-levers but with the connecting-link dispensed with; and Fig. 19 is a vertical section of the same, taken on line 19 19 in said Fig. 18. Fig: 20 is a sectional view of the upper part of the valve, in which the regulating mechanism is actuated from some outside means, such as a thermostat.

Similar letters of reference are employed in all of the said above-described views to indicate corresponding parts.

Figure 3:
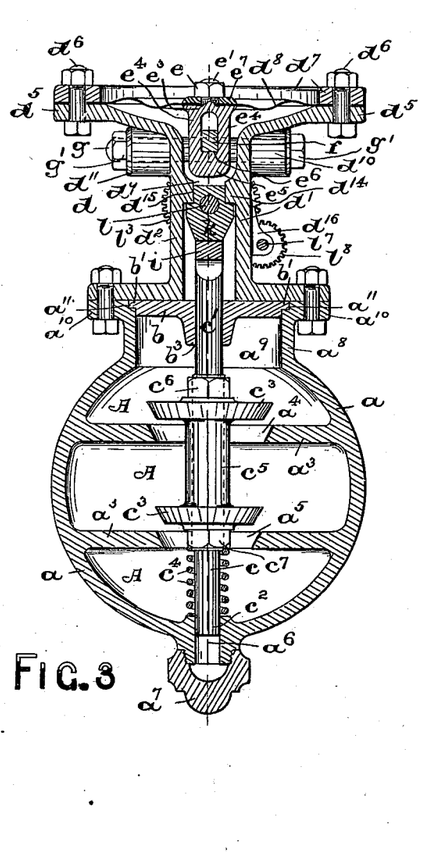
Figure 4:
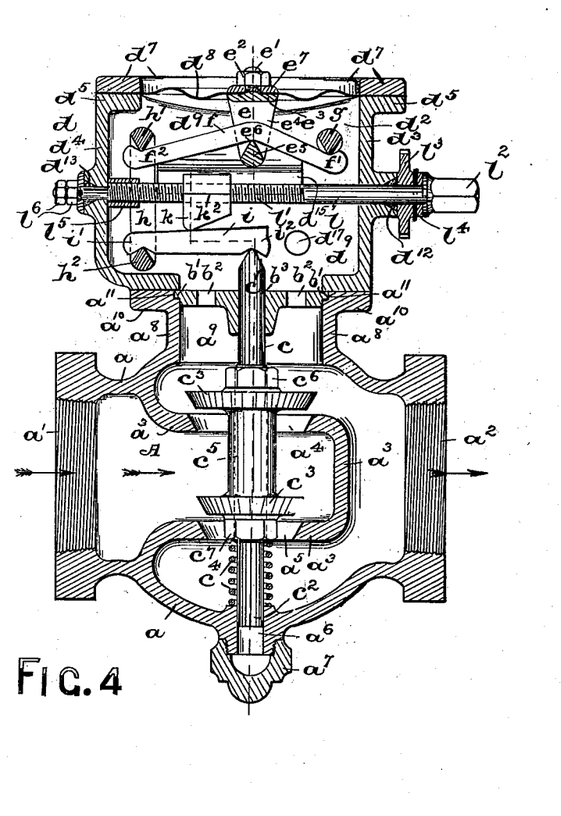
Fig. 4 is a longitudinal vertical section, of the valve.

Referring to Figs. 1 to 4, inclusive, in the construction and operation of the valve embodying the leading features of this invention, $a$ indicates the valve-casing, provided with the usual inlet $a'$ and exit $a^2$ for the flow of steam or other liquid or gas therethrough in the direction of the arrows indicated in Fig. 4.

Figure 1:
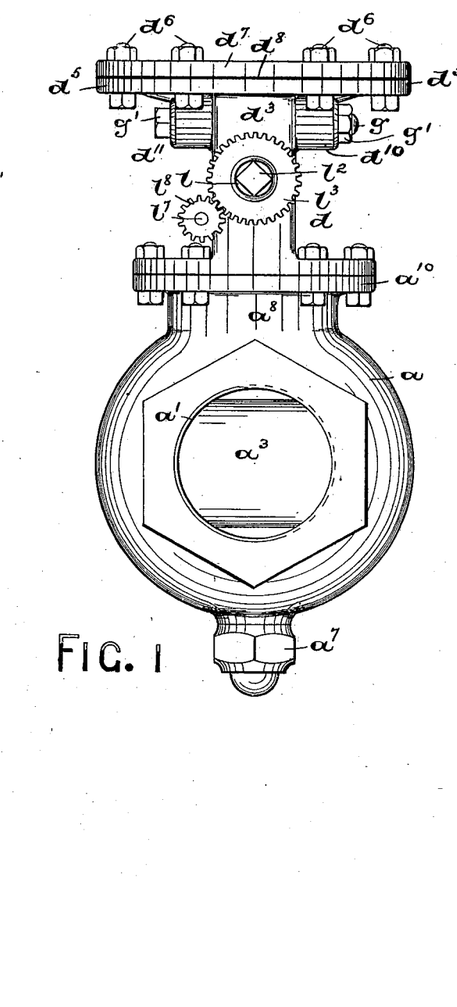
Figure 1 is an end elevation of the valve, illustrating in connection therewith the end of the fulcrum-adjusting screw and its geared connection to an indicator.
Figure 2:
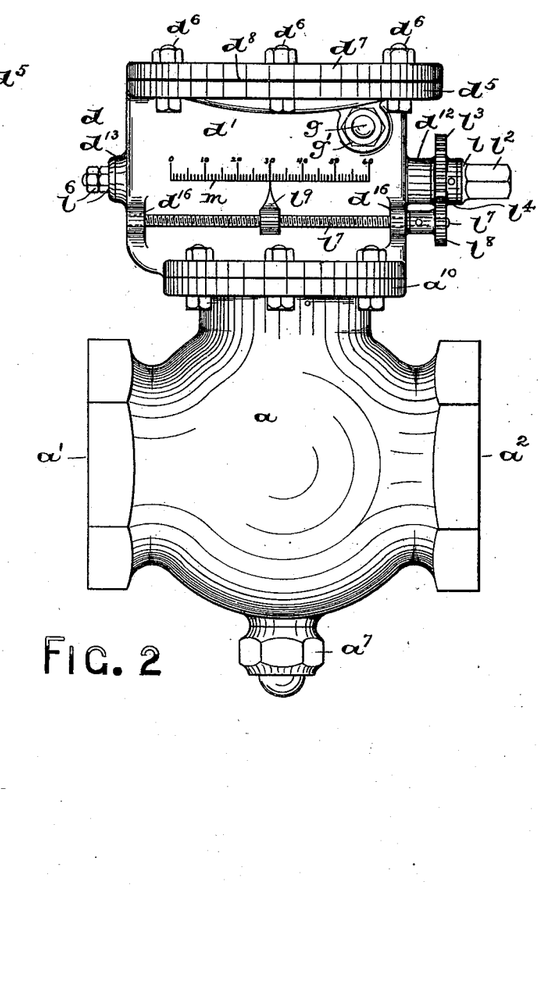
Fig. 2 is a front elevation of the valve, illustrating the general arrangement of such indicator, the scale of which is calibrated in each case of valve separately under actual steam-pressure when the valve is manufactured.
Figure 5:
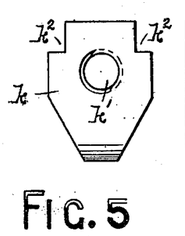
Figs. 5 and 6 are an end view and longitudinal vertical section, respectively, on an enlarged scale, of the fulcrum.
Figure 6:
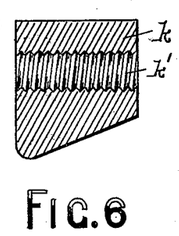
Figure 7:
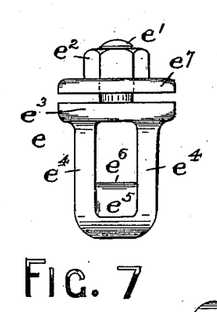
Figs. 7 and 8 are similar views of the diaphragm-fulcrum.
Figure 8:
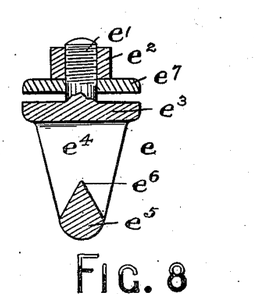
Figures 9, 10, 11, 12, 13, 14, 15, 16:
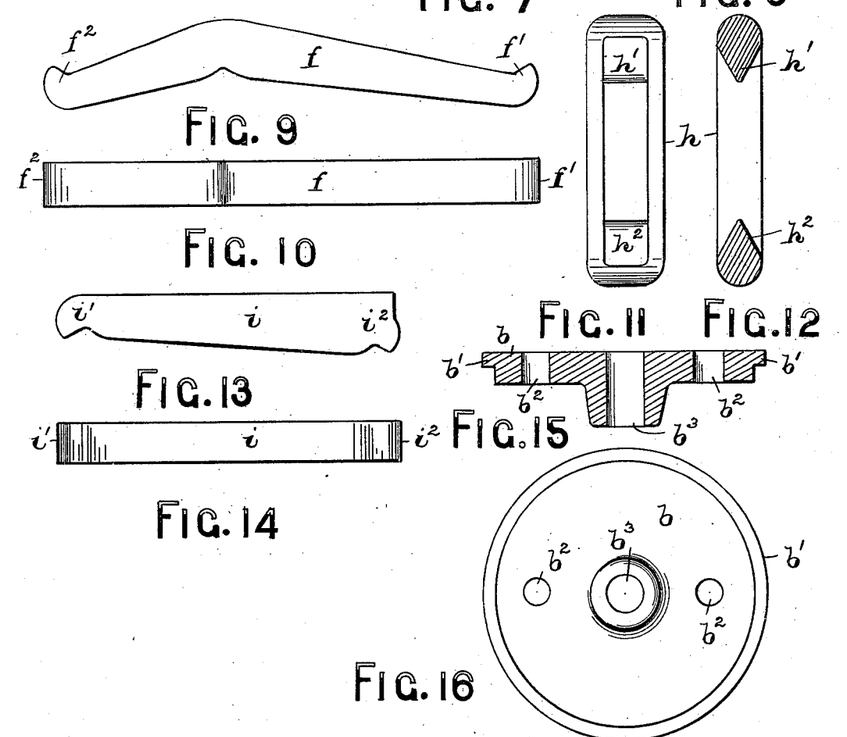

The chamber A of the valve-casing is provided with a web $a^3$, preferably of the shape and construction indicated in Figs. 3 and 4, being provided with the valve-seats $a^4$ and $a^5$; but of course it will be understood that this part of the valve construction may be varied, and I may employ any other suitable valve construction in conjunction with the valve-regulating mechanism to be hereinafter set forth in detail. In the lower portion of said casing $a$ is a socket or opening $a^6$ and a nut or cap $a^7$, employed for closing said opening. The upper portion of said casing $a$ has an annular neck $a^8$, forming a chamber $a^9$, said neck being preferably provided with an annular flange $a^{10}$, which may be recessed, as at $a^{11}$, for the reception of a suitably-constructed guide-plate $b$, which is preferably formed around its circumferential edge with a shoulder $b'$, to be fitted in said recess $a^{11}$, as illustrated. The said guide-plate is provided with a centrally-disposed opening $b^3$, and movably arranged in said socket or opening $a^6$ in the casing $a$ and said opening $b^3$ in said guide-plate $b$ are the respective ends $c'$ and $c^2$ of a valve-spindle $c$, the latter in every instance having two valve-disks $c^3$ in position above the valve-seats $a^4$ and $a^5$ and normally held open by the upward pressure of a spring $c^4$, encircling the lower part $c^2$ of the stem $c$. The disks $c^3$ are usually connected by a collar or tubular portion $c^5$ and are held in position upon the stem $c$ by means of nuts $c^6$ and $c^7$, as illustrated; but any other known manner of arranging the disks $c^3$ on the stem and securing them in place may be employed, as will be clearly understood. The said guide-plate $b$, hereinabove mentioned, is provided with one or more openings $b^2$, and secured upon the flange $a^{10}$ of the neck $a^8$ in any well-known manner is a second casing $d$, which is preferably made as illustrated, the said casing comprising the sides $d'$ and $d^2$ and the ends $d^3$ and $d^4$, provided with the flanged portions $d^5$, which are suitably perforated and have secured thereon by means of bolts $d^6$ or in any other well-known manner an open frame $d^7$. A suitably-constructed diaphragm, as $d^8$, is arranged and secured between said flanged portions $d^5$ and the frame $d^7$, substantially as illustrated in Figs. 3 and 4, the whole forming a chamber $d^9$, which is in communication with the chamber $a^9$ through the said perforated guide-plate $b$. Steam or other fluid or gas, after passing the valve-disks in the usual manner, will enter the chamber $a^9$ and pass through the opening or openings $b^2$ in the guide-plate $b$ into the chamber $d^9$, and thus come in direct contact with the diaphragm $d^8$. Secured to said diaphragm $d^8$, preferably by means of a screw portion $e'$ and nut $e^2$, is a device $e$, which I shall term the "diaphragm-fulcrum." Said device, as will be seen from Figs. 7 and 8, consists of a plate-like part $e^3$, on which the screw $e'$ is formed, and has a pair of downwardly-extending parts $e^4$, which taper toward the bottom and are connected by the solid portion $e^5$, which is preferably made V shape, to form a knife-edge $e^6$, substantially as illustrated. The said device $e$ is arranged against the under side of the diaphragm $d^8$, and its screw portion $e'$ is passed through a perforation in said diaphragm, a washer $e^7$ being arranged on said screw portion upon the outer surface of the diaphragm and the whole being held in place by the nut $e^2$. Resting upon said knife-edge $e^6$ of said diaphragm-fulcrum $e$ is a lever $f$, one end $f'$ of which is prevented from lifting by being arranged beneath a stationary fulcrum-rod $g$, extending from the longitudinal sides $d'$ and $d^2$ of the casing $d$, the ends of said rod $g$ extending into bearings $d^{10}$ and $d^{11}$ in said sides $d'$ and $d^2$ and being secured in place by nuts $g'$, as illustrated in Figs. 1 and 3. The opposite end $f^2$ of said lever $f$ has pivotally and operatively connected therewith a connecting-link $h$, preferably provided with the V-shaped portions $h'$ and $h^2$ at the top and bottom of said link, as clearly illustrated in Fig. 12. Operatively arranged upon said portion $h^2$ of the link $h$ is the end $i'$ of a lever $i$, which I shall term the "spindle-lever", the opposite end $i^2$ of said lever $i$ resting upon the upper and pointed end of the spindle $c$. In sliding arrangement with the upper surface of said lever $i$ is a movable fulcrum $k$. The said fulcrum $k$ has a screw-threaded perforation $k'$, as shown in Figs. 5 and 6, and is movably arranged upon the screw-threaded part $l'$ of a rod $l$, forming an adjusting-screw. Said rod is rotatively arranged in suitable stuffing-boxes or bearings $d^{12}$ and $d^{13}$ in the narrow sides $d^3$ and $d^4$ of the casing $d$, said rod having a squared or other suitably-formed portion $l^2$ for the reception of a wrench for turning the same and being prevented from sliding longitudinally in its bearings $d^{12}$ and $d^{13}$ by means of a pinion $l^3$ at or near the squared end portion $l^2$ and by an arrangement of a pin $l^4$ near one end of said rod $l$ and a screw-collar $l^5$ and a pair of nuts $l^6$ on the opposite screw end of said rod $l$, one of said nuts $l^6$ acting as a lock-nut, as clearly illustrated in Fig. 4. To prevent the rotative movement of said fulcrum $k$ on the rod $l$ when the latter is turned, the said fulcrum is cut away on opposite sides, as at $k^2$, (see Fig. 5,) said cut-away portions bearing lightly against a pair of ribs or guides $d^{14}$ and $d^{15}$, formed on the respective longitudinal sides $d'$ and $d^2$ of the casing $d$. By this means the pressure is also taken off the adjusting or regulating screw $l$, as will be clearly evident. The side $d'$ of the casing $d$ is also provided on its outer surface with a pair of bearings $d^{16}$, in which is rotatively arranged a screw-rod $l^7$, having a gear-wheel $l^8$ in operative mesh with said pinion $l^3$ on the rod $l$, and an index $l^9$, which is movably arranged on the rod $l^7$, when the latter is turned, said index $l^9$, pointing to the desired pounds-pressure on a scale $m$, to which the fulcrum $k$ has been set by turning the squared portion $l^2$ of the rod $l$. When the diaphragm $d^8$ is raised by the pressure from the fluid or gas in the chamber $d^9$, its fulcrum $e$ lifts the end $f^2$ of the lever $f$. The entire movement, greatly multiplied owing to the arrangement of the lever $f$ with the fixed fulcrumal support $g$, is transmitted to the connecting-link $h$, and thus to the spindle-lever $i$. This lever $i$ is the one on which the adjustable fulcrum $k$ is operated, and the relative location of said fulcrum $k$ to the bearing-point $h'$ of the link $h$ and the top of the valve-spindle $c$ is the controlling means for regulating the positions of the valve-disks above their seats, and thereby controlling the flow of the liquid or gas through the valve and regulating the pressure.

From an inspection of Fig. 4 it will be seen that when the fulcrum $k$ is in a position on the rod $l$ directly over the valve-spindle the valve-disks will be closed down tight upon their seats.

When the several levers and parts connected therewith are put in motion, as hereinabove described, the immediate effect is to push the valve disk or disks closer down upon its valve seat or seats, with the result that the amount of steam or other fluid or gas passing through the valve is diminished to whatever point is required to produce in the chamber $a^9$ the pressure desired and for which the indicator on the outside of the valve has been set.

It will be clearly understood that the result of a rise in the initial pressure will cause the immediate lifting of the diaphragm and the consequent closing of the valve to a greater degree until the same point of low pressure is reached, and this effect is instantaneous.

In the case of a low initial pressure the reverse of the above will occur, with the same result, in that the diaphragm $d^8$ will fall under the reduced pressure, and the consequent opening of the valve will at once take place, as will be clearly understood.

From the above description it will be seen that I have devised a simply-constructed pressure-regulating mechanism for valves, preferably provided with balanced seats, which is perfectly operative and efficient in use, and in the present construction, the valve itself being double-seated and balanced, all the regulating mechanism has to do is to overcome the constant pressure of the small spring surrounding the lower portion of the valve-spindle $c$, this spring being only of sufficient strength to hold up the weight of the movable parts of the valve construction.

The valve is extremely sensitive and instantly responds to the slightest change in pressure against the diaphragm, and thus the change in the initial pressure may be said not to effect the low-pressure side at all.

When the valve is to be used as a pump-governor or for other like purposes where it is necessary to exert a pressure upon the diaphragm $d^8$ by some fluid or gas other than that passing through the main body of the valve, the same construction illustrated in Figs. 1 to 4, inclusive, may be employed. In this case, however, the guide-plate $b$ is given a quarter-turn, whereby the hole or holes $b^2$ in said plate are brought directly beneath the flanges of the casing $d$, (see Fig. 3,) as will be clearly obvious. Water connection from a delivery-pump is then made with an opening $d^{17}$ in the side of said casing $d$, and the indicator is set at whatever point required to deliver steam or the like in sufficient quantity to the pump to make the same run at the necessary speed to deliver water at the required pressure. In case of a rise in the initial pressure of steam the pump would run faster, and the consequent increased water-pressure against the diaphragm will be correspondingly greater and with the same effect upon the valve-disks as above noted. In case of a low steam-pressure the reverse action will take place. It will thus be seen that the construction illustrated in Figs. 1 to 4, inclusive, may be used in either manner, the hole $d^{17}$ in the casing $d$ being closed or plugged in any well-known manner when the pressure is taken directly from the chamber $a^9$ of the valve-casing.

Figures 17, 20:
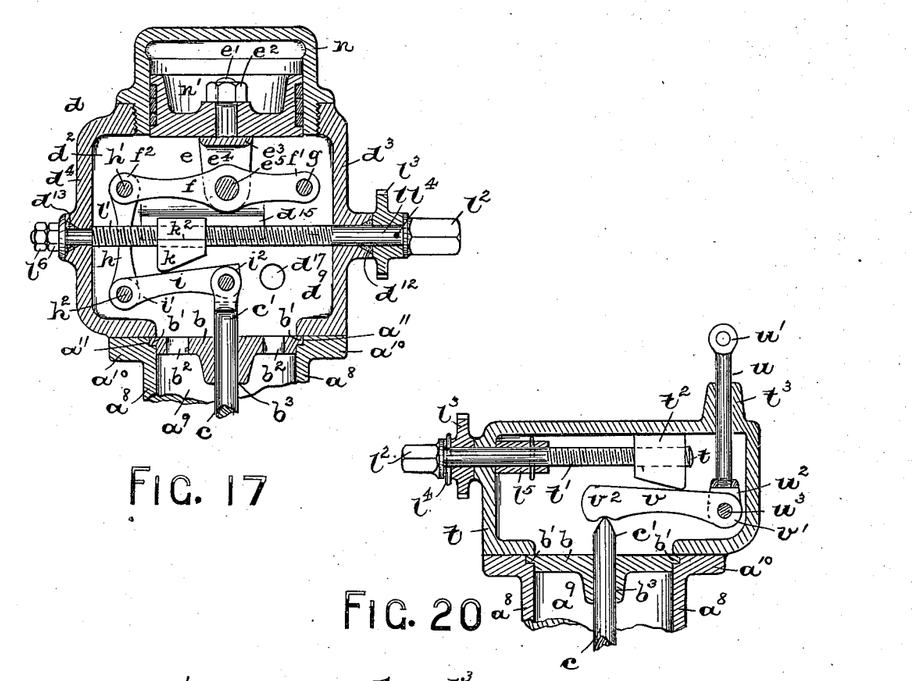

In Fig. 17 I have illustrated the pressure-regulating mechanism actuated by a piston. In this construction the general arrangement of the fulcrums and system of coöperating levers is the same as that described in connection with the valve illustrated in Figs. 1 to 4, inclusive. In the present construction the chamber $d^9$ is made substantially as illustrated in said Fig. 17, except that I dispense with the diaphragm $d^8$, and I secure upon the open top of the chamber in any suitable manner a cylinder or cap $n$, which is closed at the side and one end and has movably arranged therein a piston $n'$. Said piston is connected with the device $e$, employed in connection with the construction represented in Figs. 1 to 4, inclusive.

The working and use of the various parts represented in Fig. 17 are the same as those described in connection with Figs. 1 to 4, inclusive, and need not be further described.

Figure 18:
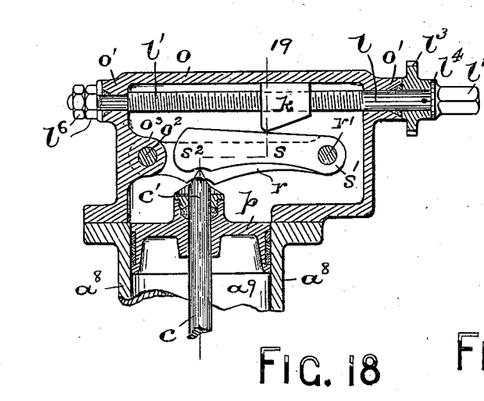
Figure 19:
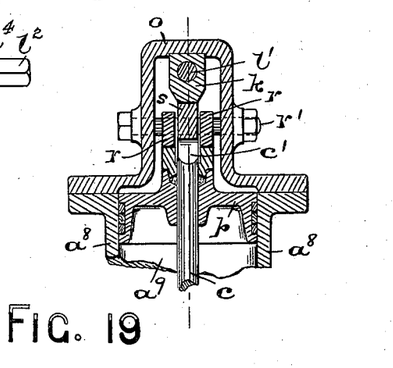

In Figs. 18 and 19 I have illustrated a slightly-different arrangement of the parts for regulating the pressure. In this construction the parts are not so numerous, for by providing the neck $a^8$ of the valve-casing $a$ with a suitable casing $o$, having bearings $o'$, in which I arrange the adjusting-screw $l$ in the same manner as above stated, and by providing the upper portion of the valve-spindle $c$ with a piston $p$ I can dispense with the use of the link $h$. In this construction a pair of levers or arms $r$ are pivoted on a pin $o^2$ in perforated ears $o^3$ on the inner surface of the casing $o$, the forward ends of said levers or arms $r$ being also perforated and having a pin $r'$ secured therein. A spindle-lever $s$ has its end $s'$ secured on said pin $r'$, and its end $s^2$ bears upon the upper portion of the valve-spindle $c$. It is of course readily seen that this construction of valve mechanism must be operated directly by the medium passing through and from the main casing of the valve and cannot be used in connection with a pump-governor.

If desired, the mechanism for regulating the pressure may be actuated from some outside sources, either mechanically or electrically, where the valve is to be used for drying-rooms or other heating purposes and where the temperature is an important feature. This arrangement of valve is illustrated in Fig. 20 of the drawings. In this construction I use a casing $t$ in connection with the neck $a^8$ and chamber $a^9$ of the valve-casing $a$ and a regulating-screw $t'$ and fulcrum $t^2$, which are arranged substantially as shown. Movably arranged in a bearing $t^3$ is a rod or stem $u$, which has an eye $u'$ at its upper end and a yoke $u^2$ at its lower end. Said yoke $u^2$ has a pin $u^3$, upon which is arranged the end $v'$ of a spindle-lever $v$, the free end $v^2$ of which bears upon the upper end of the valve-spindle, and thereby causes the valve-disks to be raised or lowered when the rod or stem $u$ is correspondingly lowered or raised by means of a thermostat or any other well-known apparatus, which is connected with the eye $u'$ of said rod or stem.

I am fully aware that many changes may be made in the various arrangements and combinations of the mechanism and parts comprising the present invention without departing from the scope of my invention. Hence I do not limit my invention to the exact arrangement and combinations of the mechanism as described in the present specification and illustrated in the accompanying drawings, nor do I confine myself to the detailed construction of such mechanism or the parts thereof.

Having thus described my invention, what I claim is—

1. A balanced valve, consisting, essentially, of a main-valve casing provided with a valve-seat, a valve-disk in said casing, an upwardly-extending valve-stem therein, a guiding means in the neck of said casing in which said stem is free to move, a chambered auxiliary casing arranged above the neck of the valve-casing, a means of communication between said two casings, combined with a laterally-moving fulcrum in said auxiliary casing in slidable engagement with the inner sides of said casing to prevent turning of the fulcrum during its movement, a fixed fulcrum in said auxiliary casing located at a point above the plane of the movement of said movable fulcrum, a means of suspension within said auxiliary casing, a system of coöperating levers suspended from said means of suspension and bearing against said fixed fulcrum and upon the free end of the valve-stem, and means forming a part of said auxiliary chambered casing, capable of a vibratory action by pressure against its under surface from the pressure of the gas or liquid in the main-valve casing, and with which said means of suspension is connected, for actuating said system of levers and causing them to bear against said fixed and movable fulcrums and upon the free end of said valve-stem, substantially as and for the purposes set forth.

2. A balanced valve, consisting, essentially, of a main-valve casing provided with a valve-seat, a valve-disk in said casing, an upwardly-extending valve-stem therein, a guiding means in the neck of said casing in which said stem is free to move, a chambered auxiliary casing arranged above the neck of the valve-casing, a means of communication between said two casings, combined with an adjusting-screw in said auxiliary casing, having one end extending from the side of the casing for its rotation, a laterally-moving fulcrum on said screw in slidable engagement with the inner sides of said auxiliary casing to prevent turning of said fulcrum during the rotation of said screw, a fixed fulcrum in said auxiliary casing located at a point above the plane of movement of said movable fulcrum, a means of suspension within said auxiliary casing, a system of coöperating levers suspended from said means of suspension and bearing against said fixed fulcrum and upon the free end of the valve-stem, and means forming a part of said auxiliary chambered casing, capable of a vibratory action by pressure against its under surface from the pressure of the gas or liquid in the main-valve casing, and with which said means of suspension is connected, for actuating said system of levers and causing them to bear against said fixed and movable fulcrums and upon the free end of said valve-stem, substantially as and for the purposes set forth.

3. A balanced valve, consisting, essentially, of a main-valve casing provided with a valve-seat, a valve-disk in said casing, an upwardly-extending valve-stem therein, a guiding means in the neck of said casing in which said stem is free to move, a chambered auxiliary casing arranged above the neck of the valve-casing, a means of communication between said two casings, combined with a laterally-moving fulcrum in said auxiliary casing in slidable engagement with the inner sides of said casing to prevent turning of the fulcrum during its movement, a fixed fulcrum in said auxiliary casing located at a point above the plane of movement of said movable fulcrum, a means of suspension within said auxiliary casing, a system of coöperating levers suspended from said means of suspension and bearing against said fixed fulcrum and upon the free end of the valve-stem, and a flexible diaphragm connected with said auxiliary casing and forming a part thereof, capable of a vibratory action by pressure against its under surface from the pressure of the gas or liquid in the main-body casing, and with which said means of suspension is connected, for actuating said system of levers and causing them to bear against said fixed and movable fulcrums and upon the free end of said valve-stem, substantially as and for the purposes set forth.

4. A balanced valve, consisting, essentially, of a main-valve casing provided with a valve-seat, a valve-disk in said casing, an upwardly-extending valve-stem therein, a guiding means in the neck of said casing in which said stem is free to move, a chambered auxiliary casing arranged above the neck of the valve-casing, a means of communication between said two casings, combined with an adjusting-screw in said auxiliary casing, having one end extending from the side of the casing for its rotation, a laterally-moving fulcrum on said screw in slidable engagement with the inner sides of said auxiliary casing to prevent turning of said fulcrum during the rotation of said screw, a fixed fulcrum in said auxiliary casing located at a point above the plane of movement of said movable fulcrum, a means of suspension within said auxiliary casing, a system of coöperating levers suspended from said means of suspension and bearing against said fixed fulcrum and upon the free end of the valve-stem, and a flexible diaphragm connected with said auxiliary casing and forming a part thereof, capable of a vibratory action by pressure against its under surface from the pressure of the gas or liquid in the main-valve casing, and with which said means of suspension is connected, for actuating said system of levers and causing them to bear against said fixed and movable fulcrums and upon the free end of said valve-stem, substantially as and for the purposes set forth.

5. A balanced valve, consisting, essentially, of a main-valve casing provided with a valve-seat, a valve-disk in said casing, an upwardly-extending valve-stem thereon, a guiding means in the neck of said casing in which said stem is free to move, a chambered auxiliary casing arranged above the neck of the valve-casing, a means of communication between said two casings, combined with a laterally-moving fulcrum in said auxiliary casing in slidable engagement with the inner sides of said casing to prevent turning of the fulcrum during its movement, a fixed fulcrum in said auxiliary casing located at a point above the plane of movement of said movable fulcrum, a means of suspension within said auxiliary casing, a fulcrum-lever connected with said means of suspension and bearing at one end against said fixed fulcrum, a link connected with the opposite end of said fulcrum-lever, a spindle-lever between said link and the free end of said valve-stem and bearing on said end of the valve-stem, and means forming a part of said auxiliary chambered casing, capable of a vibratory action by pressure against its under surface from the pressure of the gas or liquid in the main-valve casing, and with which said means of suspension is connected, for actuating said levers and causing them to bear against said fixed and movable fulcrums and upon the free end of said valve-stem, substantially as and for the purposes set forth.

6. A balanced valve, consisting, essentially, of a main-valve casing provided with a valve-seat, a valve-disk in said casing, an upwardly-extending valve-stem thereon, a guiding means in the neck of said casing in which said stem is free to move, a chambered auxiliary casing arranged above the neck of the valve-casing, a means of communication between said two casings, combined with an adjusting-screw in said auxiliary casing, having one end extending from the side of the casing for its rotation, a laterally-moving fulcrum on said screw in suitable engagement with the inner sides of said auxiliary casing, to prevent turning of said fulcrum during the rotation of said screw, a fixed fulcrum in said auxiliary casing located at a point above the plane of movement of said movable fulcrum, a means of suspension within said auxiliary casing, a fulcrum-lever connected with said means of suspension and bearing at one end against said fixed fulcrum, a link connected with the opposite end of said fulcrum-lever, a spindle-lever between said link and the free end of said valve-stem and bearing on said end of the valve-stem, and means forming a part of said auxiliary chambered casing, capable of a vibratory action by pressure against its under surface from the pressure of the gas or liquid in the main-valve casing, and with which said means of suspension is connected, for actuating said levers and causing them to bear against said fixed and movable fulcrums and upon the free end of said valve-stem, substantially as and for the purposes set forth.

7. A balanced valve, consisting, essentially, of a main-valve casing provided with a valve-seat, a valve-disk in said casing, an upwardly-extending valve-stem thereon, a guiding means in the neck of said casing in which said stem is free to move, a chambered auxiliary casing arranged above the neck of the valve-casing, a means of communication between said two casings, combined with a laterally-moving fulcrum in said auxiliary casing in slidable engagement with the inner sides of said casing to prevent turning of the fulcrum during its movement, a fixed fulcrum in said auxiliary casing located at a point above the plane of movement of said movable fulcrum, a means of suspension within said auxiliary casing, a fulcrum-lever connected with said means of suspension and bearing at one end against said fixed fulcrum, a link connected with the opposite end of said fulcrum-lever, a spindle-lever between said link and the free end of said valve-stem and bearing on said end of the valve-stem, and a flexible diaphragm connected with said auxiliary casing, and forming a part thereof, capable of a vibratory action by pressure against its under surface from the pressure of the gas or liquid in the main-valve casing, and with which said means of suspension is connected, for actuating said levers and causing them to bear against said fixed and movable fulcrums and upon the free end of said valve-stem, substantially as and for the purposes set forth.

8. A balanced valve, consisting, essentially, of a main-valve casing provided with a valve-seat, a valve-disk in said casing, an upwardly-extending valve-stem thereon, a guiding means in the neck of said casing in which said stem is free to move, a chambered auxiliary casing arranged above the neck of the valve-casing, a means of communication between said two casings, combined with an adjusting-screw in said auxiliary casing, having one end extending from the side of the casing for its rotation, a laterally-moving fulcrum on said screw in suitable engagement with the inner sides of said auxiliary casing, to prevent turning of said fulcrum during the rotation of said screw, a fixed fulcrum in said auxiliary casing located at a point above the plane of movement of said movable fulcrum, a means of suspension within said auxiliary casing, a fulcrum-lever connected with said means of suspension and bearing at one end against said fixed fulcrum, a link connected with the opposite end of said fulcrum-lever, a spindle-lever between said link and the free end of said valve-stem and bearing on said end of the valve-stem, and a flexible diaphragm connected with said auxiliary casing, and forming a part thereof, capable of a vibratory action by pressure against its under surface from the pressure of the gas or liquid in the main-valve casing, and with which said means of suspension is connected, for actuating said levers and causing them to bear against said fixed and movable fulcrums and upon the free end of said valve-stem, substantially as and for the purposes set forth.

9. In a valve, the combination, with a valve-casing, and a valve-spindle and valve-disk thereon, of a chambered casing connected with the valve-casing, a fixed fulcrumal support in said casing, an adjusting-screw in said chambered casing, having one end extending from the side of said casing, for the rotation and adjustment of said screw, a pressure-indicating scale on one side of said chambered casing, a screw working in bearings on the outer side of said chambered casing, an index movably arranged on said screw, a gear on said screw, and a pinion on said adjusting-screw in mesh with said gear, a fulcrum movably arranged upon said adjusting-screw, a system of coöperating levers arranged between said fixed fulcrum and the free end of the valve-spindle, and means for actuating said system of levers and causing them to bear against said fixed and movable fulcrums and upon the valve-spindle, to change the opening and closing of the valve and cause the valve to deliver under a uniform low pressure, while receiving a variable high pressure, substantially as and for the purposes set forth.

10. In a valve, the combination, with a valve-casing, and a valve-spindle and valve-disk thereon, of a chambered casing connected with said valve-casing, a fixed fulcrumal support in said casing, a means of direct communication between said chambered casing and said valve-casing, an adjusting-screw in said chambered casing, having one end extending from the side of said casing, for the rotation and adjustment of said screw, a pressure-indicating scale on one side of said chambered casing, a screw working in bearings on the outer side of said chambered casing, an index movably arranged on said screw, a gear on said screw, and a pinion on said adjusting-screw in mesh with said gear, a fulcrum movably arranged upon said adjusting-screw, a system of coöperating levers arranged between said fixed fulcrum and the free end of the valve-spindle, and means for actuating said system of levers by the direct pressure from the liquid or gas passing through the valve-casing and thereby causing said levers to bear against said fixed and movable fulcrums and upon the valve-spindle, to change the opening and closing of the valve and cause the valve to deliver under a uniform low pressure, while receiving a variable high pressure, substantially as and for the purposes set forth.

11. In a valve, the combination, with a valve-casing, and a valve-spindle and valve-disk thereon, of a chambered casing connected with said valve-casing, a fixed fulcrumal support in said casing, a means of direct communication between said chambered casing and said valve-casing, an adjusting-screw in said chambered casing, having one end extending from the side of said casing, for the rotation and adjustment of said screw, a pressure-indicating scale on one side of said chambered casing, a screw working in bearings on the outer side of said chambered casing, an index movably arranged on said screw, a gear on said screw, and a pinion on said adjusting-screw, in mesh with said gear, a fulcrum movably arranged upon said adjusting-screw, a system of coöperating levers arranged between said fixed fulcrum and the free end of the valve-spindle, and a diaphragm with which said system of levers is operatively connected and actuated by the direct pressure of the liquid or gas passing through the valve-casing and thereby causing said levers to bear against said fixed and movable fulcrums and upon the valve-spindle, to change the opening and closing of the valve and cause the valve to deliver under a uniform low pressure, while receiving a variable high pressure, substantially as and for the purposes set forth.

In testimony that I claim the invention set forth above I have hereunto set my hand this 18th day of August, 1899.

PERCY B. TAYLOR.

Witnesses:
 FREDK. C. FRAENTZEL,
 MARCY Z. TRUSDELL.